Feb. 17, 1948.    W. L. HANSEN ET AL    2,436,042
MOTOR TERMINAL BINDING POST
Filed Oct. 25, 1946    2 Sheets-Sheet 1
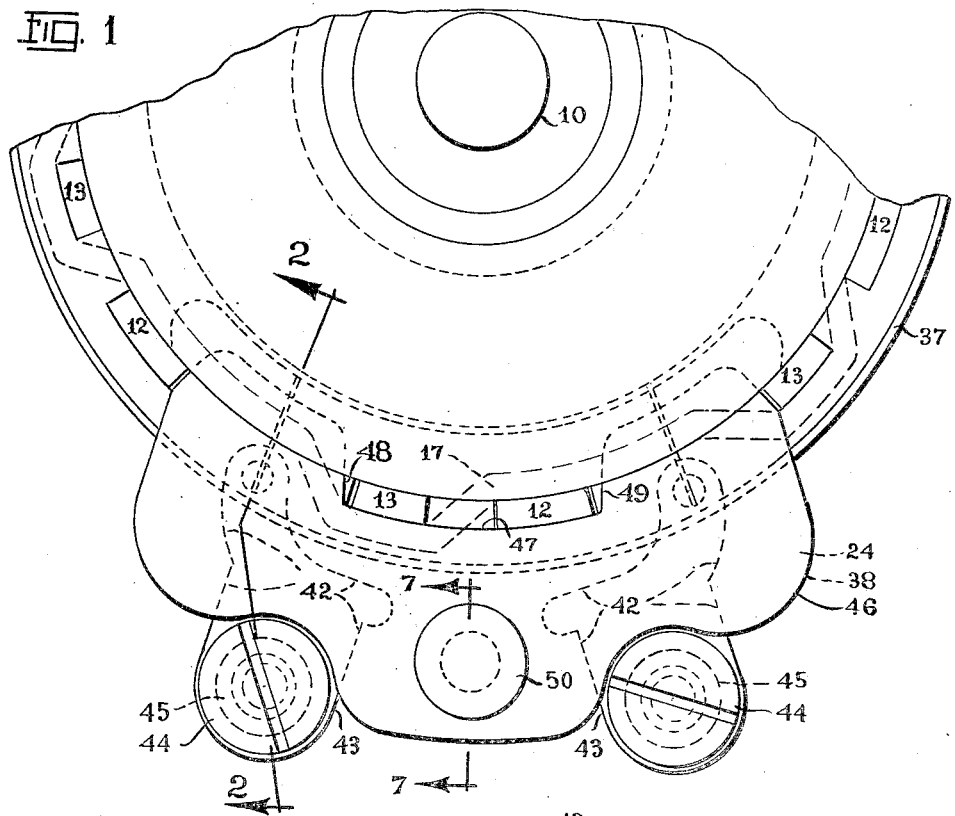
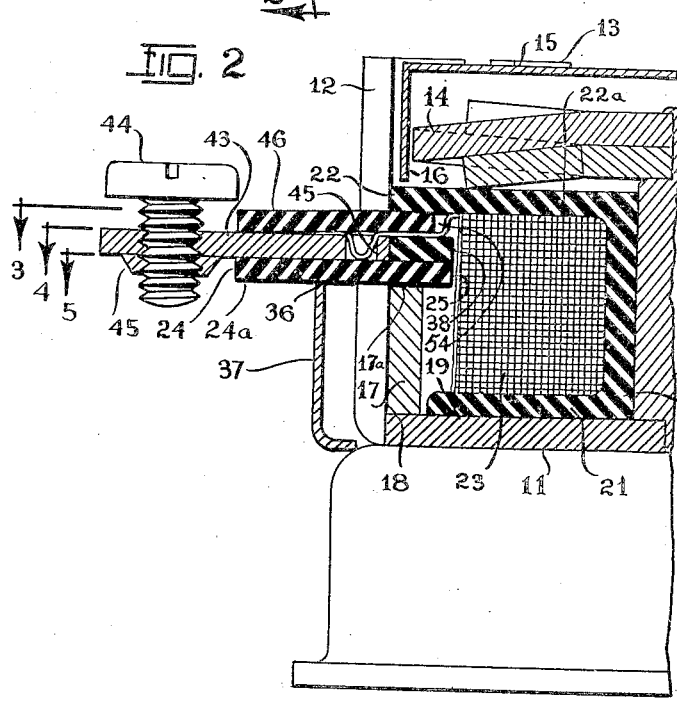
INVENTORS
WILLIAM. L. HANSEN
HARRY G. MANSON
BY
Toulmin & Toulmin
ATTORNEYS

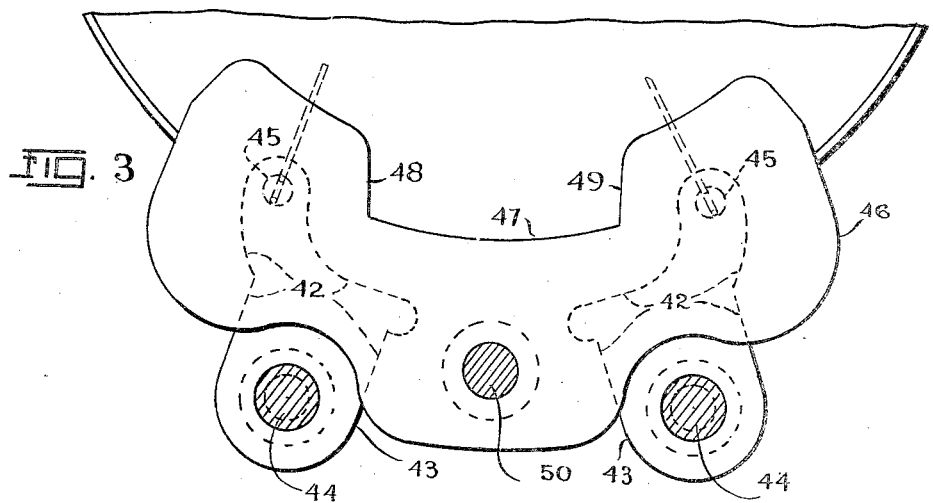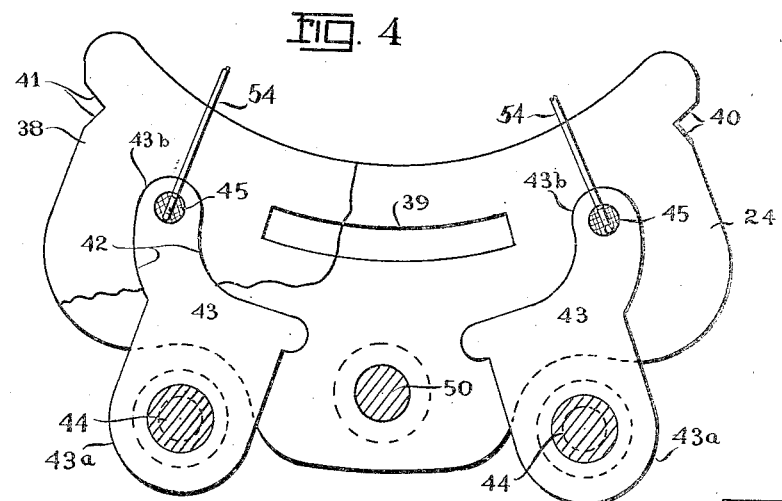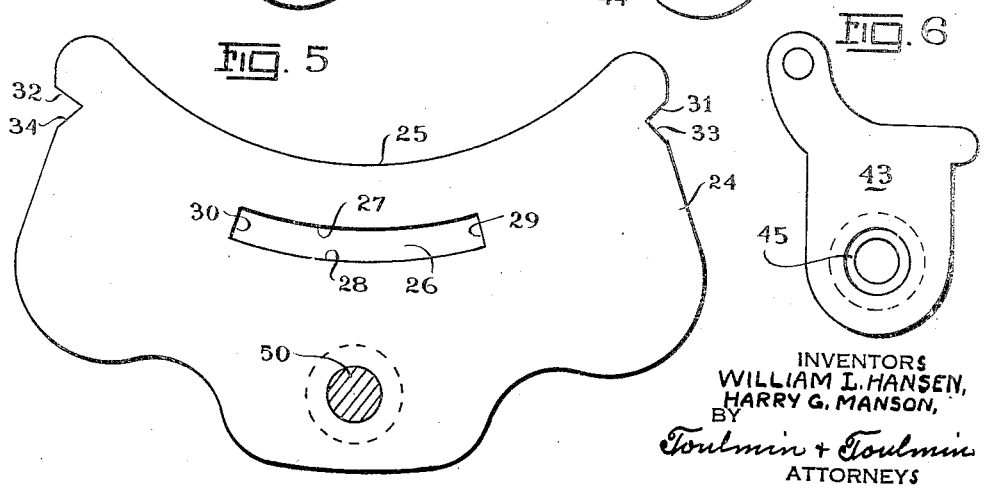

Patented Feb. 17, 1948

2,436,042

UNITED STATES PATENT OFFICE 2,436,042

MOTOR TERMINAL BINDING POST

William L. Hansen and Harry G. Manson, Princeton, Ind., assignors to Hansen Manufacturing Company Incorporated, Princeton, Ind., a corporation of Indiana Application October 25, 1946, Serial No. 705,770

6 Claims. (Cl. 172—278)

1

This invention pertains to improvements in terminal binding posts, and is particularly directed to an improved terminal binding post for synchronous electric clock motors.

One of the objects of this invention is to provide an improved terminal binding post arrangement for synchronous motors of a type, for example, as shown in Patents 2,256,711 and 2,298,373.

Another object of this invention is to provide an improved terminal binding post arrangement for synchronous motors which is supported on the field magnet of the motor, and is located closely adjacent to the field coil in such a way as to facilitate attachment of the field coil terminals to the binding posts.

Still another object of this invention is to provide a terminal binding post comprising a three-piece laminated structure mounted on the field magnets of the synchronous motor and supported by means of the shading coil and the field magnet coil spool in position on the motor.

Still another object of this invention is to provide a terminal binding post for a synchronous motor in which all of the component parts may be made on a punch press.

Further features and advantages of this invention will appear from a detail description of the drawings in which:

Figure 1 is a fragmentary plan view showing the application of the terminal binding post device, incorporating the features of applicant's invention, to a synchronous motor.

Figure 2 is a fragmentary section on the line 2—2 of Figure 1.

Figure 3 is a fragmentary section of the line 3—3 of Figure 2, showing the top plate member of the terminal binding post on the line 3—3 of Figure 2.

Figure 4 is a section on the line 4—4 of Figure 2, showing the intermediate terminal holding plate.

Figure 5 is a section on the line 5—5 of Figure 2, showing the bottom plate.

Figure 6 is a detail view of one of the terminal binding post pieces.

Figure 7 is a fragmentary enlarged section on the line 7—7 of Figure 1.

For exemplary purposes, the invention is shown applied to a synchronous electric motor of a type shown in the above mentioned patents which comprises a central magnetic core 10, to which it fixed one magnetic pole comprising a disc member 11 extending radially of the axis of the core 10 and having axially disposed pole

2 pieces 12 and 13 integrally arranged around the periphery of disc 11. To the other end of the core 10 is fixed a series of radially extending pole pieces 14. The usual rotor 15 is arranged to rotate with its cylindrical portion 16 presented between the pole pieces 12—13 and the pole pieces 14 in a manner as set forth in the above mentioned patents. An undulating shading coil 17 is fitted around the outside of the pole pieces 13 and the inside of the pole pieces 12 to provide the necessary automatic starting impulse for the rotor 15. The shading coil 17 is fitted to nicely slide on the various pole pieces 12 and 13, and is positioned by engagement of its lower surface 18 with the inner surface 19 of the disc 11.

Around the core 10 is the field coil spool 20 having a smaller diameter flange 21 and a larger diameter flange 22 between which is wound the field coil 23. The lower flange 21 is pushed down against the surface 19 of the disc 11 to properly locate the coil 23 with respect to the core 10. When an alternating current is impressed on the coil 23, an equivalent alternating flux is induced in the magnetic core 10 and the pole pieces 12—13 and the pole pieces 14, this alternating field between the pole pieces serving to drive the rotor 15 of the motor.

The very nature of the magnetic coil 23 requires that it be composed of a large number of turns of very fine small-diameter wire with the result that difficulty is presented in connecting the usual 110-volt appliance cord leads to such fine wire in an efficient manner and without damage or breakage of the fine wire leads from the coil. Applicants with their present novel arrangement have provided a terminal binding post arrangement for the appliance cord by which the leads from the magnetic coil 23 may be positively and dependably attached to the line current at all times.

This terminal binding post arrangement comprises a bottom plate member 24 best shown in Figure 5, having an inner arcuate surface 25 which is presented closely adjacent to the coil 23, as can best be seen in Figures 1 and 2. An arcuate slot 26 is formed centrally of the member 24 having a surface 27 engaging the inner faces of the pole pieces 12 and 13, and a surface 28, engaging the outer surfaces of these pole pieces. End surfaces 29 and 30 of this slot engage the side edges of the pole pieces 12 and 13 so as to accurately and firmly position the member 24 on the field magnet pole pieces 12 and 13. The outer ends of the member 24 have surfaces 31 and 32 respectively engaging other of the pole pieces 12 and 13 as shown in Figure 1, and there are also surfaces 33 and 34 which engage the inside portions of these other pole pieces to give added stability, accuracy, and rigidity of positioning of the member 24 on the field magnet structure of the motor.

The lower plate 24 is slipped over the pole pieces 12 and 13 and moved downwardly until its underneath surface 24a engages the top surface 17a of the undulating shading coil 17 which, because of its radial extent due to the undulations, provides a surface for accurately positioning the member 24 in exact radial position relative to the core 10 and coil 23. The member 24 may also be supported by the top edge 36 of the usual case or cover 37 provided for the motor structure.

On top of the plate member 24 is placed an intermediate terminal carrying and holding member 38 which has a slot 39 like that of the slot 26 in the member 24, and having notched portions 40 and 41 like the notched portions 31—33 and 32—34 of the member 24, and functioning in the same way to cooperate with the pole pieces 12 and 13 to accurately position and hold it on the motor structure. The member 38 is pressed down and firmly brought into engagement with the top surface of the member 24 and presents cut-out portions 42 which are adapted to receive the terminal binding post pieces 43 shown in Figure 6. Each of these pieces contain the usual binding post screws 44, threadedly mounted at 45 in the outward projecting end portions 43a of the binding post pieces 43. These members 43 nicely fit by their configuration into the mating openings 42 so that the inward ends 43b project in a convenient location for the leads 54 from the field coil 43 to be brought out and bent into the holes 45 in the ends 43b and secured therein by a drop of solder.

After the leads 54 have thus been secured in the holes 45, the top plate member 46 is then placed over the leads and soldered connection 45 so as to firmly pinch or bind the leads 54 between the member 38 and the top member 46. This top member fits under the surface 22a of the upper flange 22 of the magnet coil spool 20, as best seen in Figure 2. The member 46 is accurately positioned relative to the members 24 and 38 by its arcuate surface 47 and side surfaces 48 and 49 which cooperate with a pair of pole pieces 12 and 13.

After the entire binding post assembly has thus been mounted on the motor structure field pole pieces and shading coil, and the final top piece 46 has been placed in position under the surface 22a of the coil spool flange 22, a suitable rivet 50 may be passed thru all three of the members 24, 38 and 46, as shown in Figure 7, so as to securely bind the entire unit together as a rigid, firm structure, to which the power supply leads may readily be applied under the terminal screws 44 without any possible damage resulting to the fine wire leads 54 coming from the coil 23. It is also to be noted that the five members comprising the terminal binding post arrangement are each composed of flat, strip material which may readily be fabricated by punching on a punch press, while the whole assembly together forms a rigid, solid structure which facilitates the initial connecting of the appliance cord leads to the motor.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. A terminal binding post device for a synchronous electric motor having a field magnet and a field coil associated with said magnet, a pair of terminal binding posts connected to the leads of said coil, and means for mounting said binding posts rigidly on said field magnet adjacent to said coil, including a pair of laminated plate members snugly fitting a pole portion of said field magnet, binding post terminals supported in said laminations, and a third lamination adapted to enclose and hold said leads from said coil rigidly in soldered position on said terminals.

2. In a terminal binding post device for an electric synchronous motor having a magnetic core, a magnetic field member mounted on one end of said core and having outer pole pieces disposed axially in a substantially cylindrical path, a bottom plate member having means engaging said pole pieces to rigidly secure said member to said field magnet, a second plate member mounted on said field magnet and having cut-away portions for positioning and holding a pair of binding post terminals, means for soldering the leads from a field coil on said core to said binding post terminals, and a third top plate member positioned over said last mentioned plate member for holding said leads of said coil in connected position with said binding post terminals.

3. In a synchronous electric motor having a magnetic core, a field magnet member mounted on one end of said core having outer pole pieces disposed axially in a substantially cylindrical path, a spool mounted around said core, a field magnet wound on said spool, and binding post means for applying line current to the leads of said coil comprising a bottom plate member nicely fitting over the pole pieces of said field magnet, a second plate member mounted on said pole pieces having cut-out portions to accommodate terminal binding posts, means for soldering the leads from said coil to said binding post terminals, and a top plate member fitting under one disc of said spool and adjacent the pole pieces of said field magnet, and means for securing said plates together.

4. In a terminal binding post arrangement for a synchronous electric motor having a cylindrical core piece, radially extending field magnet portions on each end of said core, axially extending pole pieces from one of said portions, a field coil spool mounted around said core, a field coil wound on said spool, an undulating shading coil associated with said pole pieces, and terminal binding post means for the leads of said field coil comprising a laminated support member mounted on said pole pieces and confined axially thereon by said shading coil and said field coil spool, and terminal binding post members held by said laminated support member connected to the leads of said coil.

5. In a terminal binding post device for a synchronous electric motor having pole pieces, a field coil, and a shading coil associated with said pole pieces, a laminated structure consisting of a series of punched-out plate members adapted to hold a pair of terminal binding posts mounted on said pole pieces and confined thereon by said shading coil and a flange of a winding spool associated with said field coil, means for connecting the leads of said coils to said terminal binding posts, and means for securing said laminated structure together after connecting said leads from said coil to said binding posts.

6. In a terminal binding post arrangement for a synchronous electric motor having axially extending pole pieces, a field coil spool, an undulating shading coil associated with said pole pieces, a laminated structure for forming said device comprising a bottom plate member fitting over said pole pieces and adjacent said shading coil, a second intermediate member having cutaway portions to support and position a pair of terminal binding posts, means associated with said posts for securing leads from a field coil wound on said spool, and a top plate member engaging said spool to secure said leads to said device, and means for binding all three of said members together in a rigid unitary structure, and binding post screw means for attaching a power supply cord to said terminals.

WILLIAM L. HANSEN.
HARRY G. MANSON.

REFERENCES CITED

The following references are of record in the file of this patent:

UNITED STATES PATENTS

| Number | Name | Date |
| --- | --- | --- |
| 1,925,835 | Hanson | Sept. 5, 1933 |
| 2,049,919 | McCain | Aug. 4, 1936 |
| 2,171,989 | Poole | Sept. 5, 1939 |
| 2,243,063 | Arey | May 27, 1941 |